United States Patent
Hao et al.

(10) Patent No.: US 9,479,017 B2
(45) Date of Patent: Oct. 25, 2016

(54) DEEP V-MAGNET CAVITY STRUCTURE ROTOR

(71) Applicant: GM GLOBAL TECHNOLOGY OPERATIONS LLC, Detroit, MI (US)

(72) Inventors: Lei Hao, Troy, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 14/337,820

(22) Filed: Jul. 22, 2014

(65) Prior Publication Data

US 2016/0028279 A1    Jan. 28, 2016

(51) Int. Cl.
*H02K 1/02*    (2006.01)
*H02K 1/27*    (2006.01)

(52) U.S. Cl.
CPC .............. *H02K 1/2766* (2013.01); *H02K 1/02* (2013.01); *H02K 2213/03* (2013.01)

(58) Field of Classification Search
CPC .............................. H02K 1/02; H02K 1/2766
See application file for complete search history.

(56) References Cited

U.S. PATENT DOCUMENTS

| 7,843,100 | B2* | 11/2010 | Blissenbach | H02K 1/02 310/156.38 |
|---|---|---|---|---|
| 8,917,005 | B2* | 12/2014 | Rahman | H02K 1/2766 310/156.53 |
| 2007/0096578 | A1* | 5/2007 | Jahns | H02K 1/2766 310/156.53 |
| 2008/0231135 | A1* | 9/2008 | Suzuki | H02K 1/2766 310/156.53 |
| 2012/0194026 | A1* | 8/2012 | Matsuoka | H02K 1/2766 310/156.53 |
| 2014/0346911 | A1* | 11/2014 | Tsuchida | H02K 1/276 310/156.53 |

* cited by examiner

*Primary Examiner* — Dang Le

(57) ABSTRACT

A rotor for a permanent magnet synchronous machine. A first layer of cavities formed circumferentially within the rotor core structure. Pairs of the cavities in the first layer form V-shaped configurations and are spaced circumferentially about the rotor core structure in the first layer. A second layer of cavities is formed circumferentially within the rotor core structure. Pairs of the cavities in the second layer form V-shaped configurations and are spaced circumferentially about the rotor core structure in the second layer. A first set of permanent magnets is inserted within each cavity in the first layer and a second set of permanent magnets inserted within each cavity in the second layer. Each respective V-shaped configuration of the second layer having permanent magnets disposed therein extend greater than half a radial distance from the outer cylindrical wall to the inner cylindrical wall.

16 Claims, 2 Drawing Sheets

DEEP V-MAGNET CAVITY STRUCTURE ROTOR

BACKGROUND OF INVENTION

An embodiment relates generally to permanent magnet motors.

A permanent magnet synchronous motor is an AC motor in which rotation rate of the shaft is synchronized with the frequency of the AC supply current. A rotating electric field is generated in the stator and the rotor follows the rotating electrical field of the stator. The rotor rotates in step with the field of the stator at a same rate. The rotor and the stator are said to be in synchronization.

The permanent magnets used in conventional rotors are configured to provide a uniform field strength. Neodymium magnets, also known as rare earth magnets, are often desired due to their strong magnetic field strength which provides enhanced torque in motors. However, using rare earth magnets in a motor is costly and increases the overall price of the motor.

SUMMARY OF INVENTION

An advantage of an embodiment is the reduction overall cost of the motor by utilizing bi-permanent magnets having different field strengths. The interior permanent synchronous machine utilizes bi-permanent magnets (i.e., the combination of two or more different types of magnet materials) for reducing the number and mass of rare earth magnets utilized in the rotor. A combination of rare earth magnets and ferrite magnets, or magnets of a same material composition having different magnetic field strengths, is utilized in the rotor in a multilayer structure. Moreover, the magnets of the lesser magnetic strength (e.g., ferrite magnets) extend at least half the radial distance between outer cylinder wall of the rotor in the inner cylinder wall of the rotor thereby generating a magnetic field over a substantial portion of the rotor for increasing torque and rotational speed.

An embodiment contemplates a rotor for a permanent magnet synchronous machine. A rotor core structure having a cylindrical body. The cylindrical body includes an inner cylindrical wall and an outer cylindrical wall. A first layer of cavities formed circumferentially within the rotor core structure. Pairs of the cavities in the first layer form V-shaped configurations and are spaced circumferentially about the rotor core structure in the first layer. Each V-shaped configuration includes a first leg cavity and a second leg cavity. An apex of each V-shaped configuration formed by the first leg cavity and the second leg cavity extends toward the inner cylindrical wall. An open end of each V-shape configuration extends toward the outer cylindrical wall. A second layer of cavities is formed circumferentially within the rotor core structure. Pairs of the cavities in the second layer form V-shaped configurations and are spaced circumferentially about the rotor core structure in the second layer. Each V-shaped configuration of the second layer includes a first leg cavity and a second leg cavity. An apex of each V-shaped configuration in the second layer formed by the first leg cavity and the second leg cavity extends toward the inner cylindrical wall. An open end of each V-shape configuration in the second layer extends toward the outer cylindrical wall. A first set of permanent magnets is inserted within each cavity in the first layer. A second set of permanent magnets inserted within each cavity in the second layer. The magnetic field strength of the first set of permanent magnets is greater than the magnetic field strength of the second set of permanent magnets. Each respective V-shaped cavity and associated magnets of the first layer is paired with a respective V-shaped cavity and associated magnets of the second layer to form rotor poles. Each respective first leg in the second layer of each respective pole is outwardly offset and parallel to an associated first leg in the first layer of each respective pole. Each respective second leg in the second layer of each respective pole is outwardly offset and parallel to an associated second leg in the second layer of each respective pole. Each respective V-shaped configuration of the second layer having permanent magnets disposed therein extend greater than half a radial distance from the outer cylindrical wall to the inner cylindrical wall.

DETAILED DESCRIPTION

Figure 1:
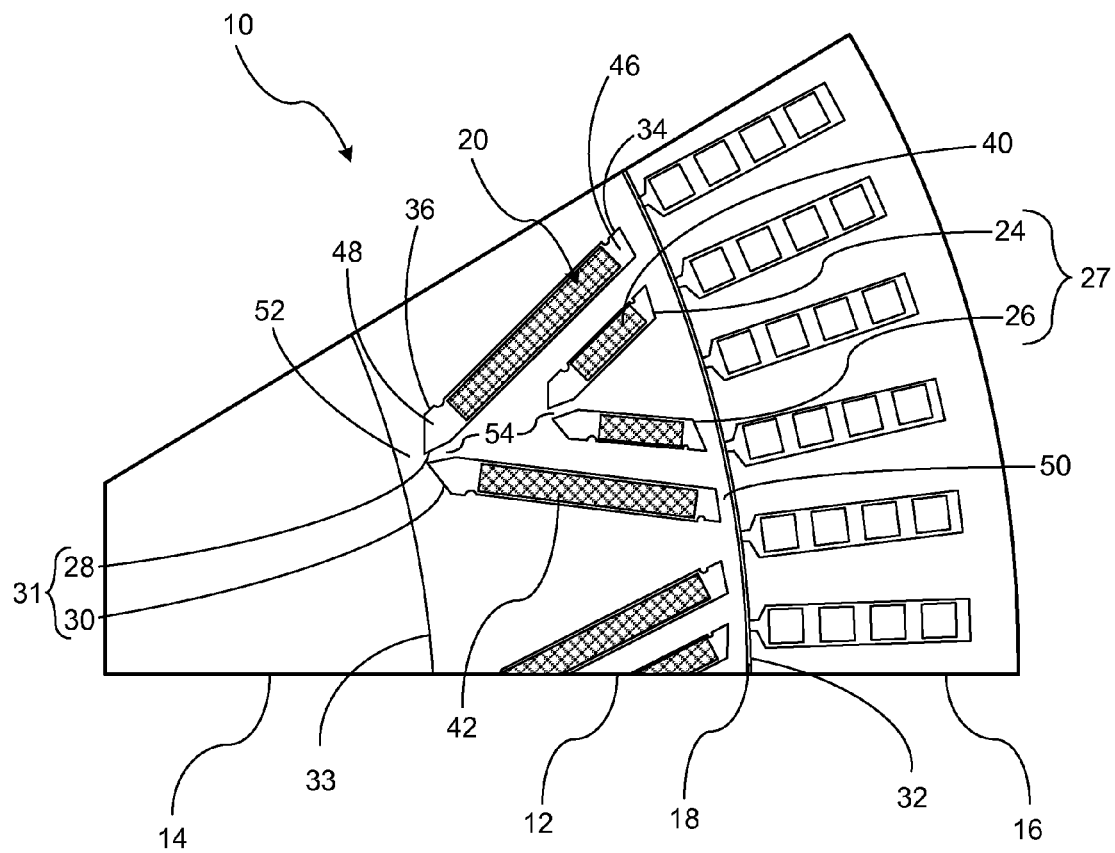
FIG. 1 is a section view of a permanent magnet motor.

There is shown in FIG. 1 a section view of a permanent magnet motor 10. The permanent magnet motor 10 includes a rotor 12 coupled to a shaft 14 or vehicle integration gearing. The rotor 12 can include any number of poles (e.g. 2, 4, 6, etc). The sectional view as shown illustrates respective poles of the rotor 12. A stator 16 is radially offset from the rotor 12 and is separated therefrom by a primary air gap 18.

The function of the rotor 12 is to drive a component coupled to the shaft 14 or gearing. The stator 16 when excited by an excitation voltage (e.g., 3-phase supply) generates a rotating magnetic field within the motor 10. The rotor, which functions as a permanent magnet locks in with the rotating magnetic field generated by the stator 16. The rotor 12 rotates along with the rotating magnetic field. When the rotor locks in with the rotating magnetic field, the motor 10 is in synchronization.

The rotor 12 as shown in FIG. 1 utilizes interior permanent magnets 20. It should be understood that the motor can be any type of permanent magnet motor and does not require interior permanent magnets. The interior permanent magnets 20 are inserted within a plurality of cavities that include first cavity legs 24 and second cavity legs 26 forming a first layer 27, and third cavity legs 28 and fourth cavity legs 30 forming a second layer 31 within the rotor 12. A pair of legs within a respective layer cooperatively forms a V-shaped configuration. For example, the first cavity leg 24 and the second cavity leg 26 form a respective V-shaped configuration in the first layer 27. Similarly, the third cavity leg 28 and the fourth cavity leg 30 cooperatively form a respective V-shaped configuration in the second layer 31. For each of the cavities in both layers, the open end of each V-shaped configuration is directed toward an outer cylinder wall 32 of the rotor 12. The apex of the V-shaped configuration is directed at the inner cylinder wall 33 of the rotor 12. The V-shaped configurations of the second layer 31 are deep V-shaped configurations in that the respective cavity legs extends at least half of the radial distance of the rotor.

The V-shaped configurations between the first layer and the second layer are structured in an overlapping multilayer structure where a respective V-shaped configuration of the second layer overlaps a respective V-shaped configuration of the first layer such that when permanent magnets are disposed in the these respective cavities, the overlapping V-shaped configurations of the first and second layers form a respective rotor pole during motor operation. The term overlapping as used herein refers to a respective leg of a respective V-shaped configuration of the first layer that is offset and parallel to a respective leg of the V-shaped configuration of the second layer in the same pole, and the other respective leg forming the V-shaped configuration of the first layer is offset and parallel to the other respective leg forming the V-shaped configuration of the second layer of the same pole.

Each respective cavity leg includes a first end section 34 and second end section 36. The first end section 34 extends toward the outer cylindrical surface wall 32 of the rotor 12. The second end section 36 extends toward the inner cylindrical surface wall 33.

The permanent magnets 20 disposed in the cavity legs of the first layer 27 include a first set of magnets 40, and the permanent magnets 20 disposed in the cavity legs of the second layer 31 includes a second set of magnets 42. The first set of magnets 40 are smaller in comparison to the second set of magnets 42, however, the magnetic properties of the first set of magnets 40 disposed in the first layer 27 are stronger than the second set of magnets 42 disposed in the second layer 31. The first set of magnets 40 are preferably of a different material composition than the second set of magnets 42. For example, the first set of magnets 40 may be a rare earth magnet (e.g., neodymium magnet) and the second set of magnets 42 may be a ferrite magnet. Alternatively, the first and second set of magnets 40 and 42 may be of a same material composition, but have different magnetic field strengths. For example, the first set of magnets 40 and the second set of magnets 42 may all be ferrite magnets or all rare earth magnets where the first set of magnets generates a stronger magnetic field than the second set of magnets. The overall cost of the magnets is reduced by requiring less of the higher magnetic field strength materials; however, the torque of the motor is increased due to the permanent magnets disposed in the deep V-shaped configuration cavities.

Each of the plurality of cavities includes a first air gap 46 and a second air gap 48. The first air gap 46 is disposed at a distal end of each cavity closest to the inner circumference wall 32. The second air gap 48 is disposed at a distal end of each cavity closest to the outer circumference wall 31. The respective air gaps formed at the distal ends of each cavity around the first set of magnets 40 and the second set of magnets 42 reduce demagnetization. As a result, each of the air gaps 46 and 48 minimize demagnetization.

The rotor 12 includes a top bridge 50 disposed between each of the first air gaps 46 and the outer circumference wall 32. The rotor 12 further includes a bottom bridge 52 disposed between each of the air gaps 48 and the inner circumference wall 33. The top bridge 50 and the bottom bridge 52 assist in achieving high-speed operation and reduced torque ripple. The rotor 12 further includes an interim bridge 54 located between an adjacent set of air gaps 48 within a same pole. The interim bridge 54 between the adjacent sets the air gaps 48 maintains rotor integrity, limits the short-circuited flux, and allows the rotor structure to be formed as a single-piece lamination.

Typical conventional rotors have cavities that extend less than half the distance between the outer circumference wall of the rotor and the inner circumference wall of the rotor. As described herein, the deep V-shaped configuration of the cavities of the second layer extends well beyond half the distance from substantially the outer cylinder wall to the substantially inner cylinder wall of the rotor. The deep V-shaped configuration of the cavities of the second layer 31 extends as far as possible toward the inner circumference wall 33 for extending the magnetic field generated by the permanent magnets (e.g., at least half the radial distance or at least three-quarters of the radial distance). Alternatively, the deep V-shaped configuration may extend to the depth where the bottom bridge is substantially four millimeters width. However, the depth is limited by the mechanical stress exerted on both the top bridge 50 and the bottom bridge 52 as well as the saturation level. This configuration is preferred for use in applications where an increased number of poles are required for enhanced flux concentration.

Figure 2:
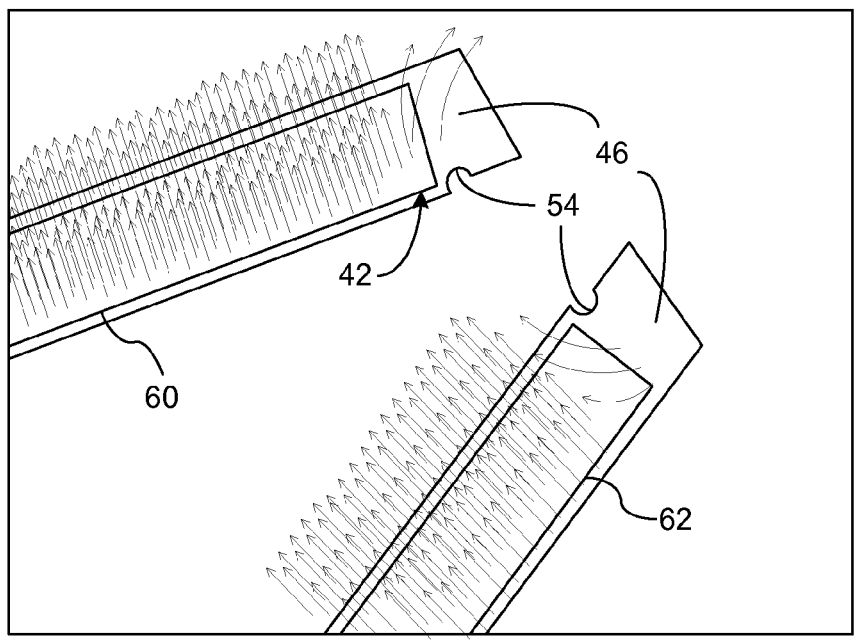
FIG. 2 is an enhanced view of the flux flow of the permanent magnet motor utilizing a magnet configuration.

FIG. 2 illustrates an enlarged section view of the rotor illustrating the deep V-shaped configuration and flux flow between permanent magnets of adjacent poles. As shown in FIG. 2, the second layer of cavities have air gaps 46 formed by the spacing between the permanent magnet 42 and the cavity wall. A locator 54 is formed on a wall of each cavity layer for positioning each permanent magnet therein. A respective magnet 60 of a pole forming a first deep V-shaped configuration is adjacent to a respective magnet 62 of an adjacent pole for the second set of magnets forming the adjacent deep V-shaped configuration. The flux flow generated by the permanent magnet 60 of the first deep V-shaped configuration is in a same direction to the flux flow of the permanent magnet 62 of the second deep V-shaped configuration.

Figure 3:
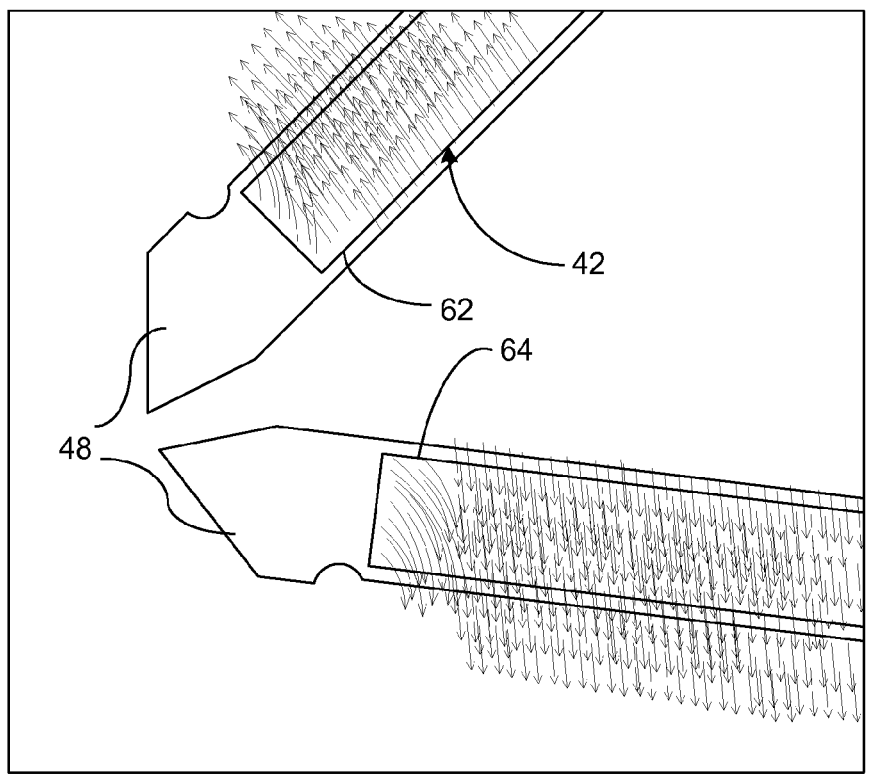
FIG. 3 is an enhanced view of the flux flow of the permanent magnet motor utilizing the magnet configuration.

FIG. 3 illustrates an enlarged section view of the rotor illustrating the deep V-shaped configuration and flux flow. The permanent magnets as shown are from the same deep V-shaped configuration for a respective pole that represent the apex of the V-shape configuration. As shown in FIG. 3, each of the cavities have air gaps 48 formed by the spacing between the permanent magnet and the cavity wall. The flux flow for a set of adjacent magnets within a pole is in opposite directions of one another. That is, the flux flow generated by the permanent magnet 62 in a respective leg of the deep V-shaped configuration is opposite to the flux flow of a permanent magnet 64 of the other respective leg of the same deep V-shaped configuration in the same pole. As a result, flux flow generated from permanent magnets within a deep V-shaped configuration flow in opposite directions with respect to one another, whereas flux flow from permanent magnets of adjacent deep V-shaped configurations from different poles flow in a same direction relative to one another.

Since the second set of magnets extend deep toward the inner circumference of the rotor, a magnetic field is generated throughout a substantial portion of the rotor, which enhances both the torque of the rotor and the rotational speed of the rotor.

While certain embodiments of the present invention have been described in detail, those familiar with the art to which this invention relates will recognize various alternative designs and embodiments for practicing the invention as defined by the following claims.

What is claimed is:

1. A rotor for a permanent magnet synchronous machine comprising:
   a rotor core structure having a cylindrical body, the cylindrical body including an inner cylindrical wall and an outer cylindrical wall;
   a first layer of cavities formed circumferentially within the rotor core structure, pairs of the cavities in the first layer form V-shaped configurations and are spaced circumferentially about the rotor core structure in the first layer, each V-shaped configuration includes a first leg cavity and a second leg cavity, an apex of each V-shaped configuration formed by the first leg cavity and the second leg cavity extends toward the inner cylindrical wall, and an open end of each V-shape configuration extends toward the outer cylindrical wall;

a second layer of cavities formed circumferentially within the rotor core structure, pairs of the cavities in the second layer form V-shaped configurations and are spaced circumferentially about the rotor core structure in the second layer, each V-shaped configuration of the second layer includes a first leg cavity and a second leg cavity, an apex of each V-shaped configuration in the second layer formed by the first leg cavity and the second leg cavity extends toward the inner cylindrical wall, an open end of each V-shape configuration in the second layer extends toward the outer cylindrical wall;

a first set of permanent magnets inserted within each cavity in the first layer; and a second set of permanent magnets inserted within each cavity in the second layer, the magnetic field strength of the first set of permanent magnets is greater than the magnetic field strength of the second set of permanent magnets;

wherein each respective V-shaped cavity and associated magnets of the first layer is paired with a respective V-shaped cavity and associated magnets of the second layer to form rotor poles, wherein each respective first leg in the second layer of each respective pole is outwardly offset and parallel to an associated first leg in the first layer of each respective pole, and wherein each respective second leg in the second layer of each respective pole is outwardly offset and parallel to an associated second leg in the first layer of each respective pole, and wherein each respective V-shaped configuration of the second layer having permanent magnets disposed therein extend greater than half a radial distance from the outer cylindrical wall to the inner cylindrical wall.

2. The rotor of claim 1 wherein each respective V-shaped configuration of the second layer having permanent magnets disposed therein extends greater than three-quarters of a radial distance from outer cylindrical wall to the inner cylindrical wall.

3. The rotor of claim 1 further comprising a plurality of bridges each extending between the apex of each V-shaped configuration in the second layer and the inner cylinder wall, the plurality of bridges providing structural support of the rotor core structure when operating, wherein a width of each respective bridge determines the radial distance that each of the legs of the V-shaped configuration extend to the inner cylinder wall.

4. The rotor of claim 1 further comprising a plurality of bridges each extending between the first and second legs of each V-shaped configuration of the open end in the second layer and the outer cylinder wall, the plurality of bridges providing structural support of the rotor core structure when operating.

5. The rotor of claim 1 wherein the plurality of cavities each includes a first air gap formed between a first end of each respective magnet disposed within each of the plurality of cavities and a first distal end of each of the plurality of cavities, wherein the first distal end is closest to the inner cylinder wall, and wherein the first air gap within each of the plurality of cavities reduces demagnetization.

6. The rotor of claim 5 wherein the plurality of cavities each includes a second air gap disposed between a second end of each respective magnet disposed within each of the plurality of cavities and a second distal end of each of the plurality of cavities, wherein the second distal end is closest to the outer cylinder wall, and wherein the second air gap within each of the plurality of cavities reduces demagnetization.

7. The rotor of claim 6 wherein each of the plurality of cavities includes a first indentation formed a first predetermined distance from the first distal end of the plurality of cavities, wherein each of the plurality of cavities includes a second indentation formed a second predetermined distance from the second distal end of the plurality of cavities, and wherein the first and second indentations prevent movement of each of the permanent magnets within the plurality of cavities from moving.

8. The rotor of claim 6 wherein the first and second air gaps generates a magnetic reluctance that assists in reducing demagnetization.

9. The rotor of claim of claim 1 further comprising a plurality of interim bridges separating the first legs and the second legs at each respective apex of each V-shaped configuration in the first layer and second layers.

10. The rotor of claim 9 wherein the plurality of interim bridges maintains rotor integrity.

11. The rotor of claim 10 wherein the plurality of interim bridges limits the short-circuited flux.

12. The rotor of claim 1 wherein the V-shaped configurations of the first layer are uniformly spaced about the first layer.

13. The rotor of claim 1 wherein the V-shaped configurations of the second layer are uniformly spaced about the second layer.

14. The rotor of claim 1 wherein the first set of magnets is rare earth magnets and the second set of magnets is ferrite magnets.

15. The rotor of claim 1 wherein the first set of magnets and second set of magnets are ferrite magnets, wherein the first set of magnets generate a greater magnetic field relative to the second set of magnets.

16. The rotor of claim 1 wherein the first set of magnets and second set of magnets are rare earth magnets, wherein the first set of magnets generate a greater magnetic field relative to the second set of magnets.

* * * * *